(12) United States Patent
Briden (10) Patent No.: US 12,441,032 B2
(45) Date of Patent: Oct. 14, 2025

(54) GENERATE WALLS ON SCREEN DEVICES TO FORM HOLES IN PARTS

(71) Applicant: Peridot Print LLC, Palo Alto, CA (US)

(72) Inventor: John J. Briden, Palo Alto, CA (US)

(73) Assignee: Peridot Print LLC, Palo Alo, CA (US)

( * ) Notice: Subject to any disclaimer, the term of this patent is extended or adjusted under 35 U.S.C. 154(b) by 119 days.

(21) Appl. No.: 18/013,050

(22) PCT Filed: Jul. 22, 2020

(86) PCT No.: PCT/US2020/043073
§ 371 (c)(1),
(2) Date: Dec. 27, 2022

(87) PCT Pub. No.: WO2022/019904
PCT Pub. Date: Jan. 27, 2022

(65) Prior Publication Data
US 2023/0311369 A1    Oct. 5, 2023

(51) Int. Cl.
*B29C 33/38* (2006.01)
*B29C 67/08* (2006.01)
(Continued)

(52) U.S. Cl.
CPC ...... *B29C 33/3842* (2013.01); *B29C 33/3814* (2013.01); *B29C 67/08* (2013.01); *B33Y 50/00* (2014.12); *B33Y 80/00* (2014.12)

(58) Field of Classification Search
CPC . B29C 33/3842; B29C 33/3814; B29C 67/08; B29C 64/165; B29C 64/30; B33Y 50/00; B33Y 80/00; B33Y 10/00; B33Y 40/20; Y02P 10/25; B22F 10/10; B22F 10/20
See application file for complete search history.

(56) References Cited

U.S. PATENT DOCUMENTS

| | | |
|---|---|---|
| 10,456,976 B1 | 10/2019 | Boyle |
| 2012/0183701 A1 | 7/2012 | Pilz et al. |
| | | (Continued) |

FOREIGN PATENT DOCUMENTS

| | | | | |
|---|---|---|---|---|
| GB | 2456502 A | * | 7/2009 | ................ D21J 3/00 |
| RU | 2269416 C2 | * | 2/2006 | ............. B33Y 40/20 |
| | | | (Continued) | |

*Primary Examiner* — Dennis R Cordray
*Assistant Examiner* — Matthew M Eslami
(74) *Attorney, Agent, or Firm* — Michael Dryja (57) ABSTRACT

According to examples, an apparatus may include a processor that may access data pertaining to a part to be fabricated from material elements in a slurry of a liquid and the material elements, the data identifying a configuration of holes to be formed in the part. The processor may also access a digital model of a screen device having a plurality of pores based on the accessed data, the screen device to be used to fabricate the part, and may determine locations on a surface of the digital model of the screen device that correspond to the identified configuration of the holes to be formed in the part. The processor may further generate, at the determined locations on the surface of the digital model of the screen device, a plurality of walls that are to form the holes in the part.

3 Claims, 5 Drawing Sheets (51) Int. Cl.
    *B33Y 50/00*          (2015.01)
    *B33Y 80/00*          (2015.01)

(56) References Cited

U.S. PATENT DOCUMENTS

| | | |
|---|---|---|
| 2016/0221114 A1 | 8/2016 | Dietrich |
| 2017/0182710 A1 | 6/2017 | Haga et al. |
| 2018/0281305 A1* | 10/2018 | Fromm ................ B33Y 30/00 |
| 2018/0370213 A1 | 12/2018 | Gold et al. |
| 2019/0152163 A1* | 5/2019 | Amaya ................ B29C 64/165 |

FOREIGN PATENT DOCUMENTS

| | | | |
|---|---|---|---|
| WO | 2017/100695 A1 | 6/2017 | |
| WO | WO-2019160565 A1 * | 8/2019 | ............. B33Y 50/00 |

\* cited by examiner

```
┌─────────────────────────────────────────────┐
│  POSITION A SCREEN DEVICE HAVING A MASTER   │
│  SURFACE AND ADDITIONAL SURFACES ONTO A MAIN│
│                    BODY                     │
│                    402                      │
└─────────────────────────────────────────────┘
                      │
                      ▼
┌─────────────────────────────────────────────┐
│   IMMERSE THE SCREEN DEVICE AND THE MAIN BODY│
│               INTO A SLURRY                  │
│                    404                       │
└─────────────────────────────────────────────┘
                      │
                      ▼
┌─────────────────────────────────────────────┐
│   APPLY A VACUUM FORCE TO FORM A PART ON THE │
│                SCREEN DEVICE                 │
│                    406                       │
└─────────────────────────────────────────────┘
                      │
                      ▼
┌─────────────────────────────────────────────┐
│     PULL THE PART AWAY FROM THE SCREEN DEVICE│
│                    408                       │
└─────────────────────────────────────────────┘
```

*FIG. 4*

GENERATE WALLS ON SCREEN DEVICES TO FORM HOLES IN PARTS

BACKGROUND

Various types of products may be fabricated from a pulp of material. Particularly, a pulp molding die that includes a main body and a wire mesh may be immersed in the pulp of material and the material in the pulp may form into the shape of the main body and the wire mesh. The main body and the wire mesh may have a desired shape of the product to be formed and may thus have a complex shape in some instances. The main body and the wire mesh may include numerous pores for liquid passage, in which the pores in the wire mesh may be significantly smaller than the pores in the main body. During formation of the product, a vacuum force may be applied through the pulp molding die which may cause the material in the pulp to be sucked onto the wire mesh and form into a shape that matches the shape of the pulp molding die. The material may be removed from the wire mesh and may be solidified to have the desired shape.

BRIEF DESCRIPTION OF THE DRAWINGS

Features of the present disclosure are illustrated by way of example and not limited in the following figure(s), in which like numerals indicate like elements, in which:

FIG. 5 shows a flow diagram of an example method for forming a part from material elements in a slurry using a screen device having walls that extend above a surface of the screen device.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are screen devices, apparatuses for 3D modeling the screen devices, and methods for using the screen devices to form parts from material elements in a slurry, such that the parts have holes. The screen devices, which may be 3D fabricated screen devices, may include a plurality of pores that extend through the screen devices and a plurality of walls that extend above surfaces of the screen devices. In use, the screen devices may be immersed in a slurry composed of a liquid and material elements and a vacuum pressure may be applied to force the liquid through the pores. As the liquid flows through the pores, some of the material elements in the slurry may collect on the surfaces of the screen devices and coalesce. However, the walls extending from the surfaces of the screen devices may prevent the material elements from coalescing at those locations. This may cause holes to be formed in the parts formed from the coalesced material elements. Depending upon the heights of the walls, the holes may extend through the formed parts and/or may be indentations in the formed parts.

According to examples, the walls may be arranged in a predefined configuration to impart a similar configuration of holes on the formed part. The predefined configuration may correspond to text, a logo, a perforation location, and/or the like. Through implementation of features of the present disclosure, a part may be formed from a slurry to include holes in a predefined configuration during formation of the part from material elements in the slurry. As a result, an additional operation of adding the holes after the part is formed may be avoided, which may increase the speed at which the parts may be fabricated.

Figure 1A:
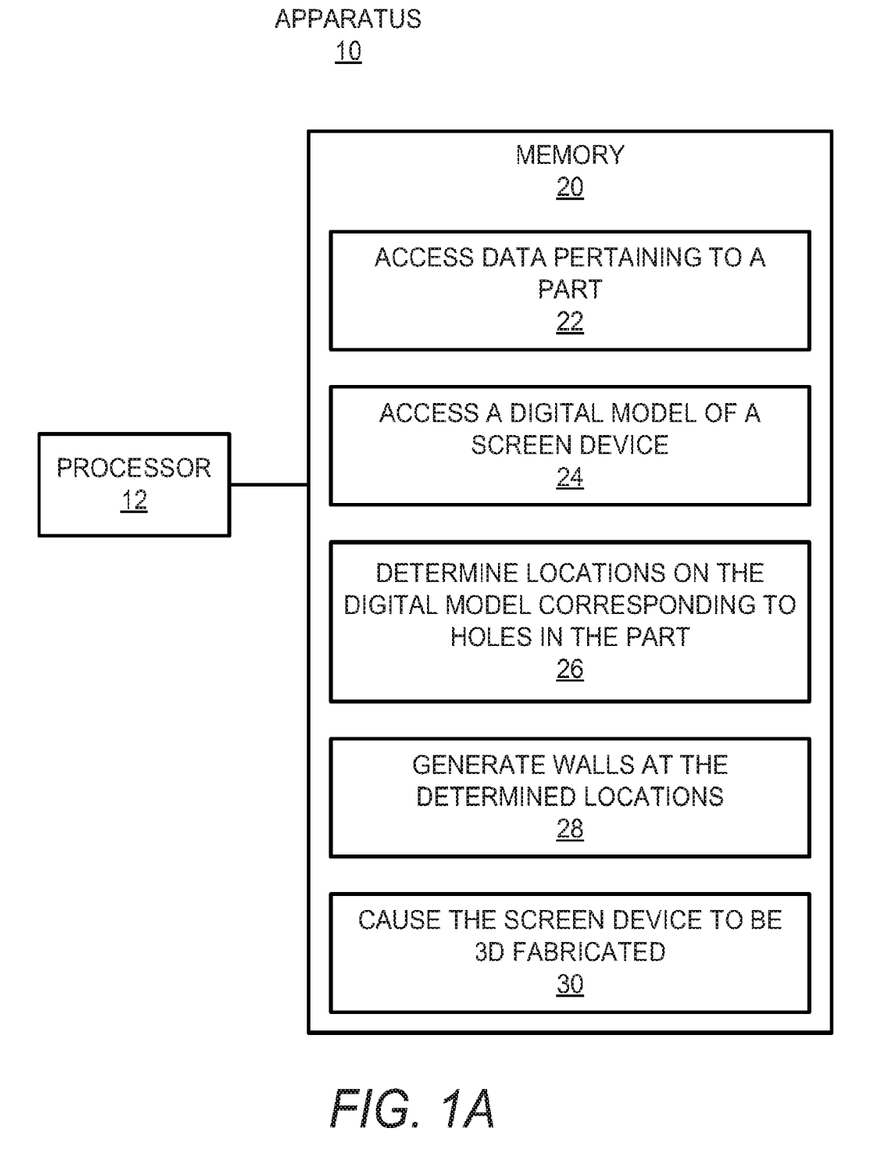
FIG. 1A shows a block diagram of an example apparatus that may generate a plurality of walls on a surface of a digital model of a screen device that is to be used to fabricate a part from material elements in a slurry.
Figure 1B:
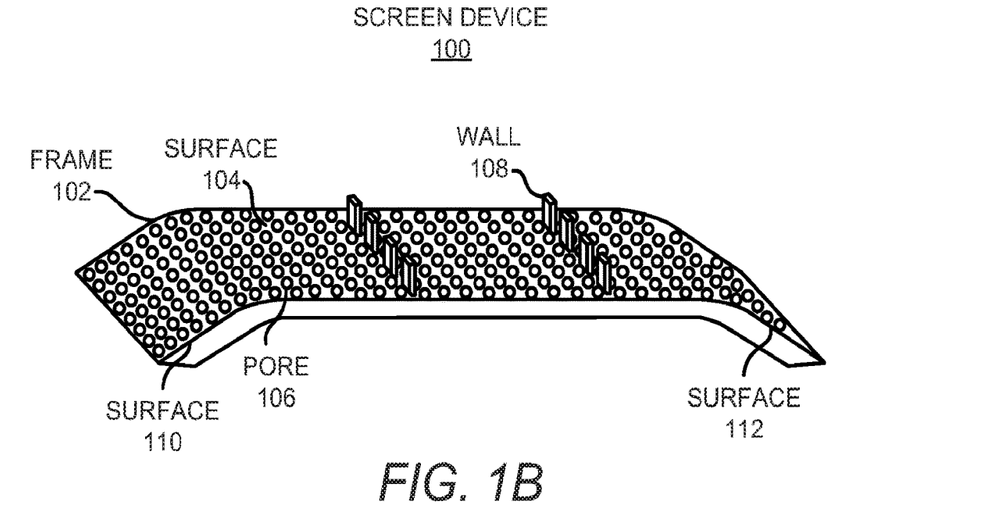
FIG. 1B shows an isometric view of an example screen device having a plurality of pores and walls.
Figure 2A:
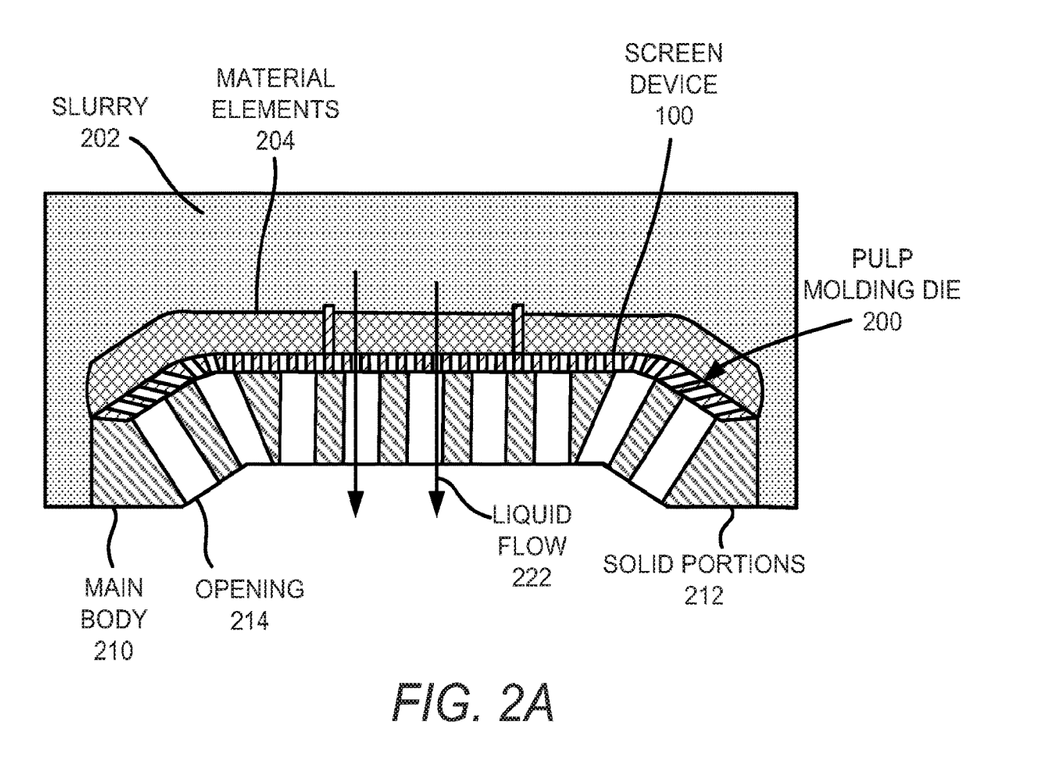
FIG. 2A shows a cross-sectional front view of an example pulp molding die in which the example screen device discussed with respect to FIG. 1B may be implemented.
Figure 2B:
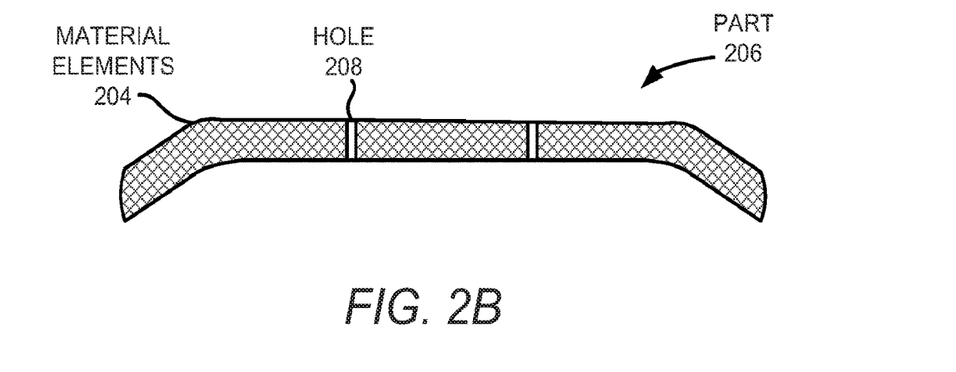
FIG. 2B shows a cross-sectional front view of an example part that may include holes formed through the part during formation of the part and after the part has been removed from the pulp molding die depicted in FIG. 2A.

Reference is first made to FIGS. 1A, 1B, and 2A-2C. FIG. 1A shows a block diagram of an example apparatus 10 that may generate a plurality of walls on a surface of a digital model of a screen device 100 that is to be used to fabricate a part 206 from material elements 204 in a slurry 202. FIG. 1B shows an isometric view of an example screen device 100 having a plurality of pores 106 and walls 108. FIG. 2A shows a cross-sectional front view of an example pulp molding die 200 in which the example screen device 100 discussed with respect to FIG. 1B may be implemented. FIG. 2B shows a cross-sectional front view of an example part 206 that may include holes 208 formed through the part 206 during formation of the part 206 and following removal of the part 206 from the pulp molding die 200 depicted in FIG. 2A. FIG. 2O shows an enlarged cross-sectional view of a section of the pulp molding die 200 shown in FIG. 2A. It should be understood that the example apparatus 10, the example screen device 100 depicted in FIG. 1B, and/or the example pulp molding die 200 depicted in FIG. 2A may include additional features and that some of the features described herein may be removed and/or modified without departing from the scopes of the apparatus 10, the screen device 100, and/or the pulp molding die 200.

The apparatus 10 may be a computing system such as a server, a laptop computer, a tablet computer, a desktop computer, or the like. As shown, the apparatus 10 may include a processor 12, which may be a semiconductor-based microprocessor, a central processing unit (CPU), an application specific integrated circuit (ASIC), a field-programmable gate array (FPGA), and/or other suitable hardware device. The apparatus 10 may also include a memory 20 that may have stored thereon machine-readable instructions (which may equivalently be termed computer-readable instructions) that the processor 12 may execute. The memory 20 may be an electronic, magnetic, optical, or other physical storage device that contains or stores executable instructions. The memory 12 may be, for example, Random-Access memory (RAM), an Electrically Erasable Programmable Read-Only Memory (EEPROM), a storage device, an optical disc, and the like. The memory 20, which may also be referred to as a computer-readable storage medium, may be a non-transitory machine-readable storage medium, where the term "non-transitory" does not encompass transitory propagating signals.

Figure 3:
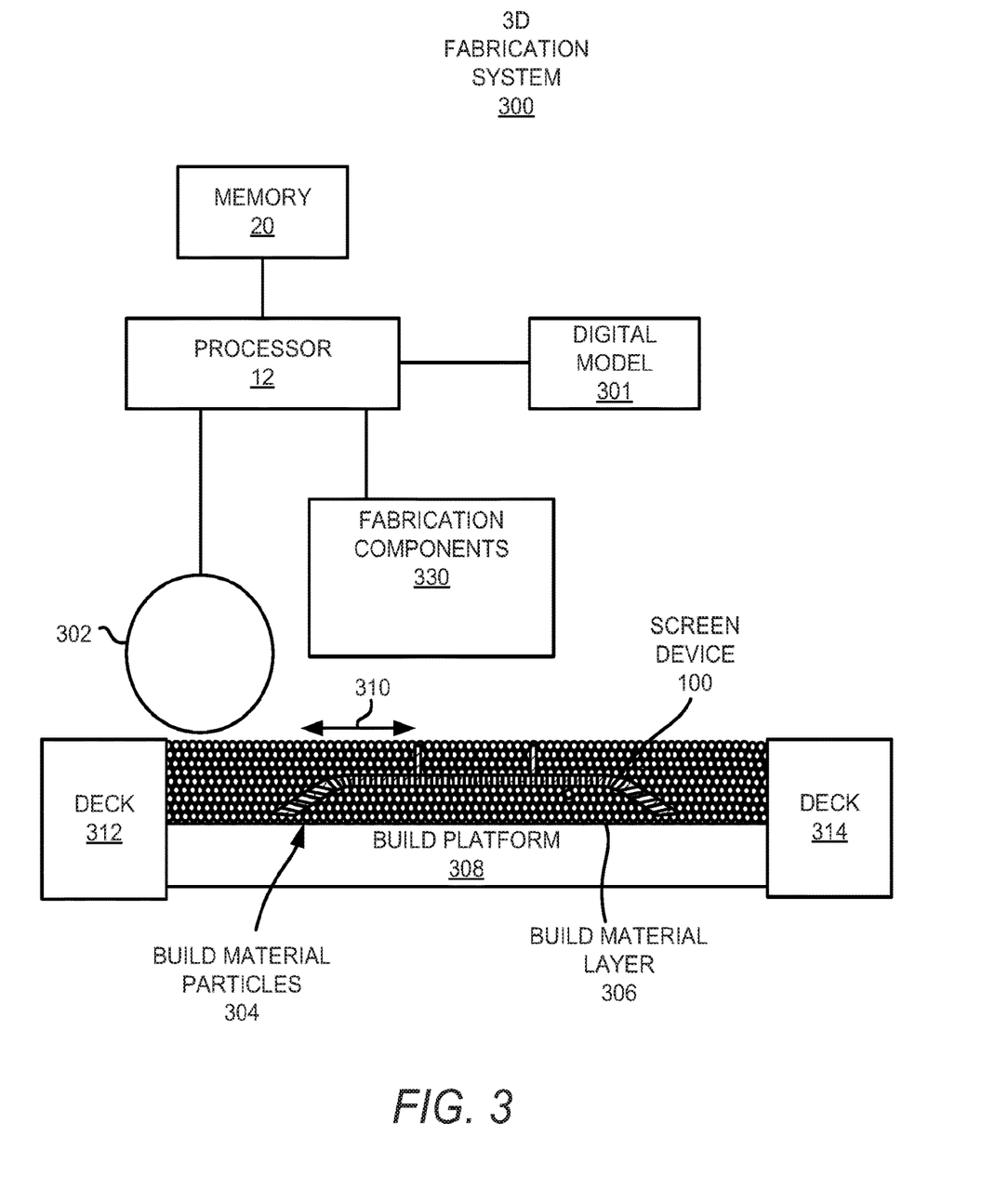

As shown in FIG. 3, the memory 20 may have stored thereon machine-readable instructions 22-30 that the processor 12 may execute. Although the instructions 22-30 are described herein as being stored on the memory 20 and may thus include a set of machine-readable instructions, the apparatus 10 may include hardware logic blocks that may perform functions similar to the instructions 22-30. For instance, the processor 12 may include hardware components that may execute the instructions 22-30. In other examples, the apparatus 10 may include a combination of instructions and hardware logic blocks to implement or execute functions corresponding to the instructions 22-30. In any of these examples, the processor 12 may implement the hardware logic blocks and/or execute the instructions 22-30. As discussed herein, the apparatus 10 may also include additional instructions and/or hardware logic blocks such that the processor 12 may execute operations in addition to or in place of those discussed above with respect to FIG. 3.

The processor 12 may execute the instructions 22 to access data pertaining to a part 206 to be fabricated from material elements 204 in a slurry 202 of a liquid and the material elements 204. The data may identify a configuration of holes 208 to be formed in the part 206. The configuration of the holes 208 may be a configuration in which the holes 208 correspond to a particular design, text, a logo, a perforation pattern, and/or the like. The data may also identify a shape of the part 206, a thickness of the part 206, and/or the like.

The processor 12 may execute the instructions 24 to access a digital model of a screen device 100 having a plurality of pores 106 based on the accessed data, in which the screen device 100 is to be used to fabricate the part 206. The processor 12 or another computing device may have previously generated the digital model, e.g., a 3D model, a computer-aided design (CAD) model, or the like, of the screen device 100 and the processor 12 may access the digital model from a data store. In other examples, the processor 12 may generate the digital model of the screen device 100.

The processor 12 may execute the instructions 26 to determine locations on a surface of the digital model of the screen device 100 that correspond to the identified configuration of the holes 208 to be formed in the part 206. In addition, the processor 12 may execute the instructions 28 to generate, at the determined locations on the surface 104 of the screen device 100, a plurality of walls 108 that are to form the holes 208 in the part 206. That is, the processor 12 may modify or update the digital model of the screen device 100 to include the plurality of walls 108 at the determined locations.

In some examples, the accessed data pertaining to the part 206 to be fabricated may indicate whether the holes 208 are to extend through the part 206. That is, the data may indicate whether the holes 208 are to be indentations or are to extend through the part 206. In these examples, the processor 12 may determine the certain height or heights at which the walls 108 are to be formed to cause the holes 208 to either extend through the part 206 or to be indentations in the part 206. The processor 12 may also generate the walls 108 to have the certain height or heights. The processor 12 may also determine the locations on the surface of the digital model of the screen device 100 to be locations on the surface 104 of the digital model that is between some of the pores 106 such that the walls 108 may not block the pores 106.

The processor 12 may also generate a plurality of pillars 232 to extend below a bottom surface of the digital model of the screen device 100. The pillars 232 may be formed on the bottom surface of the screen device 100 to provide a channel 230 between the screen device 100 and the main body 210 as discussed herein.

The processor 12 may execute the instructions 30 to cause a 3D fabrication operation to be implemented to fabricate the screen device 100 with the plurality of walls 108 formed at the determined locations on the screen device 100. The processor 12 may also cause the screen device 100 to be fabricated to include the plurality of pores 106 through the 3D fabrication operation.

As shown in FIG. 1B, the screen device 100 may include a frame 102 having a surface 104, in which a plurality of pores 106 may be formed in the frame 102. The pores 106 may extend from the surface 104 of the frame 102 through the frame 102 and to the opposite surface of the frame 102. As discussed herein, a 3D fabrication operation may be employed to fabricate the screen device 100. In this regard, for instance, the material with which the screen device 100 is formed, the thickness of the frame 102, the locations and sizes of the pores 106, may be precisely controlled. According to examples, the screen device 100 may be formed of any suitable material, such as a polymer, a plastic, a ceramic, a nylon, a metal, and/or a combination thereof.

As shown in FIG. 2A, the screen device 100 may be part of a pulp molding die 200, which may include a main body 210 that may support the screen device 100, for instance, during formation of the part 206 (FIG. 2B). The main body 210 may include solid portions 212 and openings 214. The main body 210 may also be formed to have a relatively larger thickness than the screen device 100 and may be substantially more rigid than the screen device 100. The main body 210 may thus provide structural support for the screen device 100. The solid portions 212 of the main body 210 may be formed of a substantially rigid material, such as a metal, a plastic, a ceramic, and/or the like.

The openings 214 in the main body 210 may be formed between or within the solid portions 212 through any suitable fabrication technique. For instance, the openings 214 may be formed through a 3D fabrication process, drilling, through use of a mold, and/or the like. In any of these examples, the openings 214 may extend from one side of the main body 210 to an opposite side of the main body 210. In some examples, the main body 210 and the screen device 100 may be formed together during a 3D fabrication process.

According to examples, the openings 214 in the main body 210 and the pores 106 in the screen device 100 may have circular cross-sections. In other examples, the openings 214 and/or the pores 106 may have other shapes, such as rectangular, oval, triangular, etc., shapes. In any regard, the openings 214 may be relatively larger in diameter than the pores 106 in the screen device 100.

In operation, the pulp molding die 200 may be employed to filter liquid from a slurry 202 composed of the liquid and material elements 204 to form a part 206 from the material elements 204. That is, the pulp molding die 200 may be immersed in the slurry 202 and a vacuum pressure may be applied from a side of the main body 210 opposite the screen device 100. The vacuum pressure may cause the liquid to flow through the pores 106 and the openings 214 as indicated by the arrows 222. The liquid in the slurry 202 may be water or another type of suitable liquid in which the material elements 204, which may be pulp material, e.g., paper, wood, fiber crops, bamboo, or the like, may be mixed into the slurry 202. The material elements 204 may be, for instance, fibers of the pulp material.

According to examples, the material elements 204 may have sizes that are larger than the sizes of pores 106. As a result, as liquid in the slurry 202 flows through the pores 106 in the screen device 100 and the openings 214 in the main body 210 as denoted by the arrows 222, some of the material elements 204 in the slurry 202 may be compressed onto the screen device 100 and may take the shape of the screen device 100. Particularly, the material elements 204 may form into a part 206 on the screen device 100 as the liquid is drawn from the slurry 202 as shown in FIG. 2B. The remaining material elements 204 may also be dried to form the part 206.

Figure 2C:
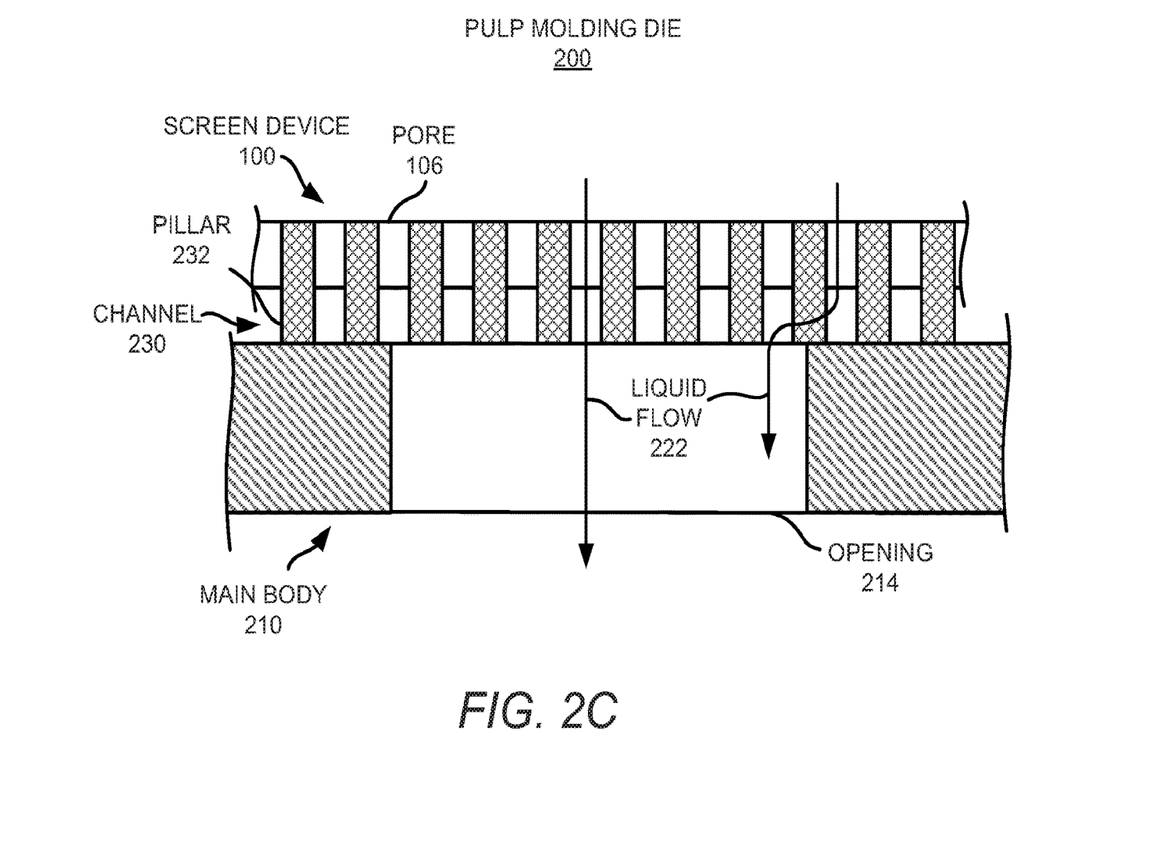
FIG. 2C shows an enlarged cross-sectional view of a section of the pulp molding die shown in FIG. 2A.

As may be seen in FIGS. 2A and 2C, some of the pores 106 in the screen device 100 may not exactly line up with the openings 214 in the main body 210. To improve liquid flow through the pores 106 that may not line up with the openings 214, channels 230 may be included between the screen device 100 and the main body 210 through which liquid may flow from the pores 106 and into the openings 214. The channels 230 may be formed by pillars 232 and may enable the flow of liquid between sections of the screen device 100 and the main body 210 that may be in contact with each other. The channels 230 may thus enable pressure to be applied through a larger number of the pores 106 and thus cause liquid to flow through the larger number of the pores 106. The pillars 232 may be formed on the screen device 100 and/or the main body 210.

As also shown in FIGS. 1 and 2A, the screen device 100 may include a plurality of walls 108 that extend above the surface 104 of the frame 102. The walls 108 may be integral with the frame 102 and may be formed on the surface 104 between some of the pores 106. Thus, for instance, the walls 108 may be formed during a 3D fabrication operation of the screen device 100 and may be formed of the same material as the frame 102. As discussed herein, the walls 108 may block or otherwise prevent the material elements 204 from forming together at the locations at which the walls 108 are formed on the frame 102. As a result, the part 206 formed from the material elements 204 may include holes 208 corresponding to the locations of the walls 108. The holes 208 may extend through the part 206 or may be indentations on the part 206.

In some examples, the material elements 204 may form to around a predefined thickness on the screen device 100. This may be accomplished by immersing the pulp molding die 200 in the slurry 202 for a certain length of time, applying the vacuum pressure for a certain length of time, controlling the amount of vacuum pressure applied, and/or the like. As the thickness of the part 206 may be predefined, the height of the walls 108 may also be predefined to either be taller or shorter than the predefined thickness. In this regard, to make the holes 208 indentations in the part 206, the walls 108 may be formed to have heights that are below the predefined thickness of the part 206. Likewise, to make the holes 208 extend through the part 206, the walls 108 may be formed to exceed the predefined thickness of the part 206. In other examples, some of the walls 108 may be below the predefined thickness and some of the walls 108 may exceed the predefined thickness.

According to examples, the walls 108 may be arranged in a predefined pattern to cause the predefined pattern to be formed from the holes 208 in the part 206 as the material elements 204 are formed into the part 206 on the surface 104 of the frame 102. The predefined pattern may be any suitable type of information, such as a name, a logo, a design, a serial number, an identification number, and/or the like. In addition, or in other examples, the predefined pattern may be a pattern that may impart a physical characteristic onto the locations at which the holes 208 are formed. The physical characteristic may be a weaker area of the part 206, e.g., perforations at which the part 206 may be torn apart.

According to examples, the screen device 100 may include additional surfaces 110, 112 that are angled with respect to the surface 104. As shown in FIGS. 1 and 2A, the surface 104, which is also referenced herein as a master surface, may be perpendicular to the direction in which the part 206 may be removed from the screen device 100. That is, in FIG. 2, the part 206 may be removed from the screen device 100 by pulling the part 206 in an upward direction with respect to the screen device 100. In addition, the walls 108 may be formed on the surface 104 without being formed on the additional surfaces 110, 112, as walls 108 formed on the additional surfaces 110, 112 may inhibit the pulling off of the part 206 from screen device 100. In addition, or alternatively, the walls 108 formed on the additional surfaces 110, 112 may become damaged as the part 206 is pulled off of the screen device 100. In other examples, however, the walls 108 may be formed on the additional surfaces 110, 112 and the part 206 may be pulled away from the screen device 100 in a direction different than the upward direction.

In some examples, screen devices 100 having differently arranged walls 108 may be employed in the pulp molding die 200. Thus, the same main body 210 may be employed with different screen devices 100 to make parts 206 having different arrangements of holes 208, e.g., to make the same types of parts 206 with different logos, identifiers, and/or the like. In any regard, it should be understood that the shape and configuration of the screen device 100 depicted in FIGS. 1B, 2A, and 2C are for purposes of illustration and are thus not intended to limit the scope of the screen device 100 discussed herein in any respect.

Turning now to FIG. 3, there is shown an example 3D fabrication system 400 that may be employed to fabricate the screen device 100 depicted in FIGS. 1B, 2A, and 2C, and in some examples, the main body 210 depicted in FIGS. 2A and 2C. It should be understood that the example 3D fabrication system 400 depicted in FIG. 3 may include additional features and that some of the features described herein may be removed and/or modified without departing from the scope of the 3D fabrication system 300.

During fabrication of the screen device 100, and in some examples, the main body 210, the processor 12 (or a separate controller of the 3D fabrication system 300) may control the 3D fabrication system 300 to fabricate the screen device 100 according to a digital model 301 in which walls may have been generated on a surface of a digital model of the screen device 100 that are to form the holes 208 in a part 206. The processor 12 may have generated the digital model 301 as discussed herein with respect to FIG. 1A. During the fabrication operation, the processor 12 may (or the separate controller) control a recoater 302 to spread, spray, or otherwise form build material particles 304 into a build material layer 306 on a build platform 308 as the recoater 302 is moved across the build platform 308 as indicated by the arrow 310. The build material particles 304 may include any suitable material for use in forming 3D objects, for instance, a polymer, a plastic, a ceramic, a nylon, a metal, combinations thereof, or the like, and may be in the form of a powder or a powder-like material. According to examples, the build platform 308 may provide a build area for the build material particles 304 to be spread into successive layers 306 of build material particles 304. The build platform 308 may be movable in a direction away from the recoater 302 during formation of successive build material layers 306.

According to examples, the 3D fabrication system 300 may include decks 312, 314 from which build material particles 304 may be supplied for formation into build material layers 306. For instance, the deck 312 may supply an amount of build material particles 304 on top of the deck 312 that the recoater 302 may push over the build platform 308 as the recoater 302 is moved across the build platform 308 as denoted by the arrow 310 to form a build material layer 306 on the build platform 308 or on a previously formed build material layer 306.

As shown, the processor 12 may control operations of the recoater 302. The processor 12 may control other components of the 3D fabrication system 300. For instance, the 3D fabrication system 300 may include fabrication components 330 and the memory 20 may have instructions that the processor 12 may execute to control the fabrication components 330. Particularly, the processor 12 may control the fabrication components 330 to cause the build material particles 304 at selected locations of the build material layer 306 to be bound and/or fused together to form portions of the frame 102 with the pores 106 and the walls 108 in the build material layer 306.

The fabrication components 330 may include an agent delivery device that the processor 12 may control to selectively deliver an agent onto the build material layer 306. For instance, the processor 12 may control the agent delivery device to deliver a fusing agent onto the selected locations of the build material layer 306 that are to be bound/fused together to form the frame 102 and the walls 108. By way of particular example, the agent delivery device may be a printhead having a plurality of nozzles in which droplet ejectors, e.g., resistors, piezoelectric actuators, and/or the like, may be provided to eject droplets of an agent through the nozzles.

According to examples, the agent may be a fusing and/or a binding agent to selectively bind and/or solidify the build material particles 304 on which the agent has been deposited. In particular examples, the agent may be a chemical binder, a thermally curable binder, and/or the like. In other particular examples, the agent may be a fusing agent that may increase the absorption of energy to selectively fuse the build material particles 304 upon which the agent has been deposited. The fabrication components 330 may also include another agent delivery device that the processor 12 may control to selectively deliver another type of agent onto the build material layer 306. The other type of agent may be a detailing agent, which may inhibit or prevent fusing of build material particles 304 upon which the detailing agent has been deposited, for example by modifying the effect of a fusing agent.

The fabrication components 330 may also include an energy source that may apply energy, e.g., warming energy, onto the build material layer 306, for instance, to warm the build material particles 304 in the build material layer 306 to an intended temperature. The energy source may output energy, e.g., in the form of light and/or heat and may be supported on a carriage, which may be movable across the build platform 308. As such, for instance, the energy source may output energy onto the build material layer 306 as the carriage is moved across the build platform 308 to cause the build material particles 304 upon which the fusing agent has been deposited to melt and subsequently fuse together. In other examples, the screen device 100 may be formed through implementation of another fabrication technique. For instance, the screen device 100 may be formed through selective laser ablation, selective laser melting, stereolithography, fused deposition modeling, and/or the like.

Figure 4:
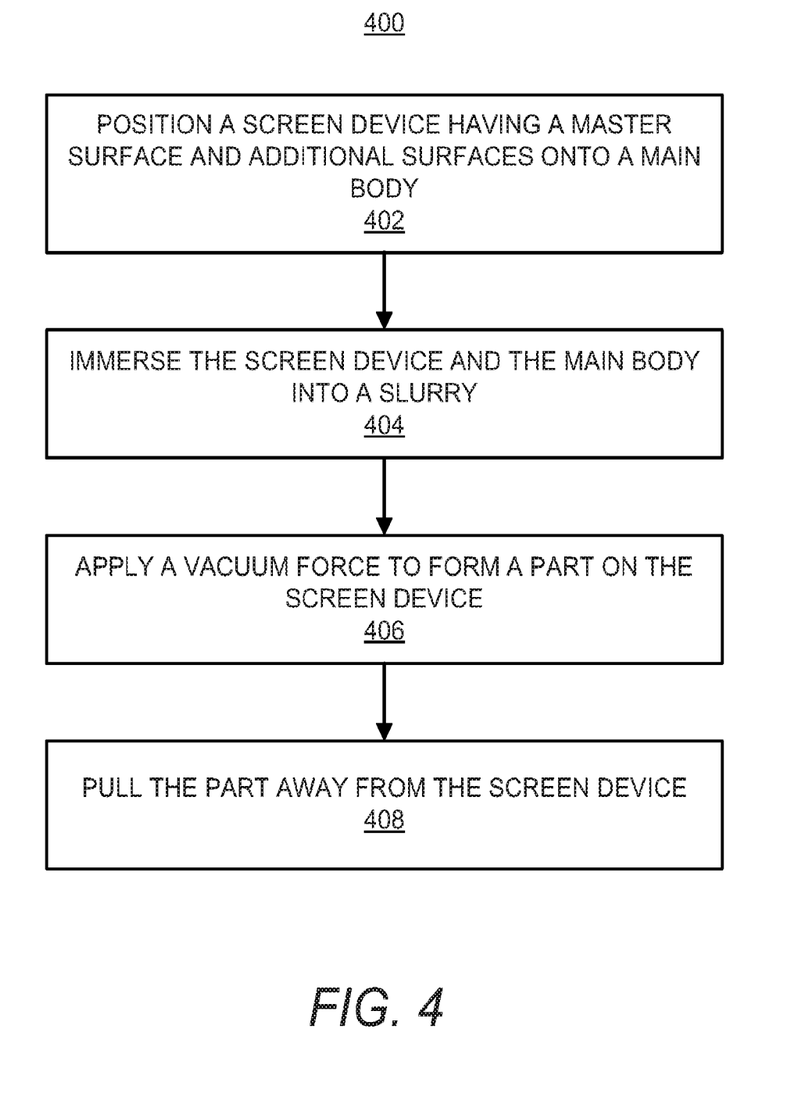
FIG. 4 shows an example 3D fabrication system that may be employed to fabricate the screen device depicted in FIGS. 1B, 2A, and 2C.

Reference is now made to FIG. 4, which depicts a flow diagram of an example method 400 for forming a part 206 from material elements 204 in a slurry 202 using a screen device 100 having walls 108 that extend above a surface 104 of the screen device 100. It should be understood that the method 400 depicted in FIG. 4 may include additional operations and that some of the operations described therein may be removed and/or modified without departing from the scope of the method 400. The description of the method 400 is also made with reference to the features depicted in FIGS. 1A-3 for purposes of illustration.

At block 402, a screen device 100 having a master surface 104 and additional surfaces 110, 112 may be positioned onto a main body 210 having openings 214 and a similar top profile as a bottom profile of the screen device 100. The screen device 100 may have a plurality of pores 106 and a plurality of walls 108 extending above the master surface 104 between some of the plurality of pores 106 as discussed herein.

At block 404, the screen device 100 and the main body 210 may be immersed into a slurry 202, in which the slurry 202 may include material elements 204 and a liquid. At block 406, a vacuum force may be applied from beneath the main body 210 through the openings 214 and the plurality of pores 106 to cause the material elements 204 to be drawn onto the screen device 100 and form into a part 206 and the liquid to be forced through the plurality of pores 106. As discussed herein, the walls 108 may form holes 208 in the part 206 formed by the material elements 204.

At block 408, the part 206 may be pulled away from the screen device 100, for instance, in a direction that is normal to the master surface 104. In other examples, the part 206 may be pulled away from the screen device 100 in another direction. As discussed herein, the additional surfaces 110, 112 may be angled with respect to the master surface 104. Particularly, the additional surfaces 110, 112 may have angles that are greater than 90 degrees with respect to an axis that is perpendicular to the axis at which the master surface 104 extends. As a result, the part 206 may more easily be removed from the screen device 100. In addition, the part 206 may be pulled away from the screen device 100 following a predefined length of time from when the vacuum force was applied, in which a thickness of the part 206 corresponds to the predefined length of time.

As discussed herein, the walls 108 may have heights that may correspond to whether the holes 208 in the part 206 are to extend through the part 206 or are to be thinner than the thickness of the part 206.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method comprising:

accessing data pertaining to a part to be fabricated from material elements in a slurry of a liquid and the material elements, the data identifying a configuration of holes to be formed in the part;

accessing a digital model of a screen device having a plurality of pores based on the accessed data, the screen device to be used to fabricate the part;

determining locations on a surface of the digital model of the screen device that correspond to the identified configuration of the holes to be formed in the part;

determining whether the accessed data indicates that the holes are to extend through the part;

determining, at the determined locations on the surface of the digital model of the screen device, a plurality of walls that are to form the holes in the part, including generating the plurality of walls to a certain height based on whether the holes are to extend through the part; and causing a three-dimensional (3D) fabrication operation to be implemented to fabricate the screen device with the plurality of walls formed at the determined locations on the screen device, wherein the walls extend from the screen device and correspond to the holes to be formed in the part using the screen device, such that the holes are not in the screen device itself.

2. The method of claim 1, further comprising:

determining the locations on the surface of the digital model of the screen device to be locations on the surface of the digital model that is between some of the plurality of pores.

3. The method of claim 1, further comprising:

generating a plurality of pillars to extend below a bottom surface of the digital model of the screen device.

* * * * *